(12) United States Patent
St. Onge

(10) Patent No.: US 6,357,994 B1
(45) Date of Patent: Mar. 19, 2002

(54) MULTI-PURPOSE END EFFECTOR FOR A ROBOTIC ARM

(75) Inventor: Douglas L. St. Onge, Cudahy, WI (US)

(73) Assignee: ABB Flexible Automation, Inc., New Berlin, WI (US)

( * ) Notice: Subject to any disclaimer, the term of this patent is extended or adjusted under 35 U.S.C. 154(b) by 0 days.

(21) Appl. No.: 09/411,409

(22) Filed: Oct. 1, 1999

(51) Int. Cl.[7] .................................................. B66C 1/00
(52) U.S. Cl. ........................ 414/738; 294/2; 294/87.1; 198/468.2
(58) Field of Search ............................... 414/736, 738; 294/2, 87.1, 93; 198/468.2

(56) References Cited

U.S. PATENT DOCUMENTS

| | | | |
|---|---|---|---|
| 2,080,941 A | 5/1937 | Hutchinson | 51/103 |
| 2,329,301 A | 9/1943 | Schmidt | 51/236 |
| 2,478,607 A | 8/1949 | Theler | 51/103 |
| 2,788,620 A | 4/1957 | Marcus | 51/131 |
| 3,490,179 A | 1/1970 | Militzer | 51/67 |
| 3,533,258 A | 10/1970 | Leonard, Jr. | 72/108 |
| 3,541,921 A | 11/1970 | Helfer | 90/1 |
| 3,707,101 A | 12/1972 | Werth | 82/2.7 |
| 3,728,829 A | 4/1973 | Ellis | 51/215 H |
| 3,766,617 A | 10/1973 | Forster | 29/33 |
| 3,783,777 A | 1/1974 | Killen | 101/40 |
| 3,797,497 A | 3/1974 | Crim | 128/310 |
| 3,886,845 A | 6/1975 | Hodgson | 90/1.6 |
| 3,999,645 A | 12/1976 | Kaulfuss | 198/358 |
| 4,106,632 A | 8/1978 | Bossi | 214/1 BB |
| 4,414,780 A | 11/1983 | Jorgenson | 51/26 |
| 4,445,405 A | 5/1984 | Champeau | 82/2.5 |
| 4,483,105 A | 11/1984 | Bender | 51/227 R |
| 4,505,636 A | * 3/1985 | Sugino et al. | 414/736 |
| 4,519,733 A | 5/1985 | Gregg | 409/7 |
| 4,577,483 A | 3/1986 | Rehag | 72/214 |
| 4,655,676 A | * 4/1987 | Jannborg et al. | 414/736 |
| 4,817,256 A | 4/1989 | Riti | 29/33 |
| 4,872,380 A | 10/1989 | Holy | 82/124 |
| 5,111,562 A | 5/1992 | Burka | 29/37 |
| 5,119,594 A | 6/1992 | Riha | 51/52 |
| 5,315,750 A | 5/1994 | Roseliep | 29/563 |
| 5,465,597 A | 11/1995 | Bajraszewski | 72/19 |
| 5,871,326 A | * 2/1999 | Haninger et al. | 414/736 X |
| 5,885,038 A | 3/1999 | Huber | 409/7 |

* cited by examiner

Primary Examiner—Donald W. Underwood
(74) Attorney, Agent, or Firm—Sokol Law Office

(57) ABSTRACT

This invention relates to a multi-purpose end effector for a robotic arm that moves a workpiece through an automated, multi-station, manufacturing operation. The end effector is particularly useful in a gear manufacturing operation in which a gear piece is annealed, ground and tested to ensure it meets desired specifications. The relatively lightweight and compact end effector securely grips the workpiece during multi-directional movements, and provides a degree of softness when loading the normally non-rotating workpiece onto a continuously rotating chuck or tool. The end effector is secured to the robotic arm by a cross-member equipped with three different gripping implements. A central gripping device extends from the middle of the cross-member, a loading arm extends from one end of the cross-member, and an unloading arm extends from the other end. Each gripping implement includes pneumatically controlled gripping fingers for holding the gear pieces. Each loading and unloading arm has a gripping cylinder and a rotatable sleeve for supporting its gripping mechanism. The loading arm has an extension cylinder for extending its gripping mechanism with a degree of softness or resiliency that helps prevent binding when the normally non-rotating workpiece engages the rotating chuck or tool.

23 Claims, 11 Drawing Sheets

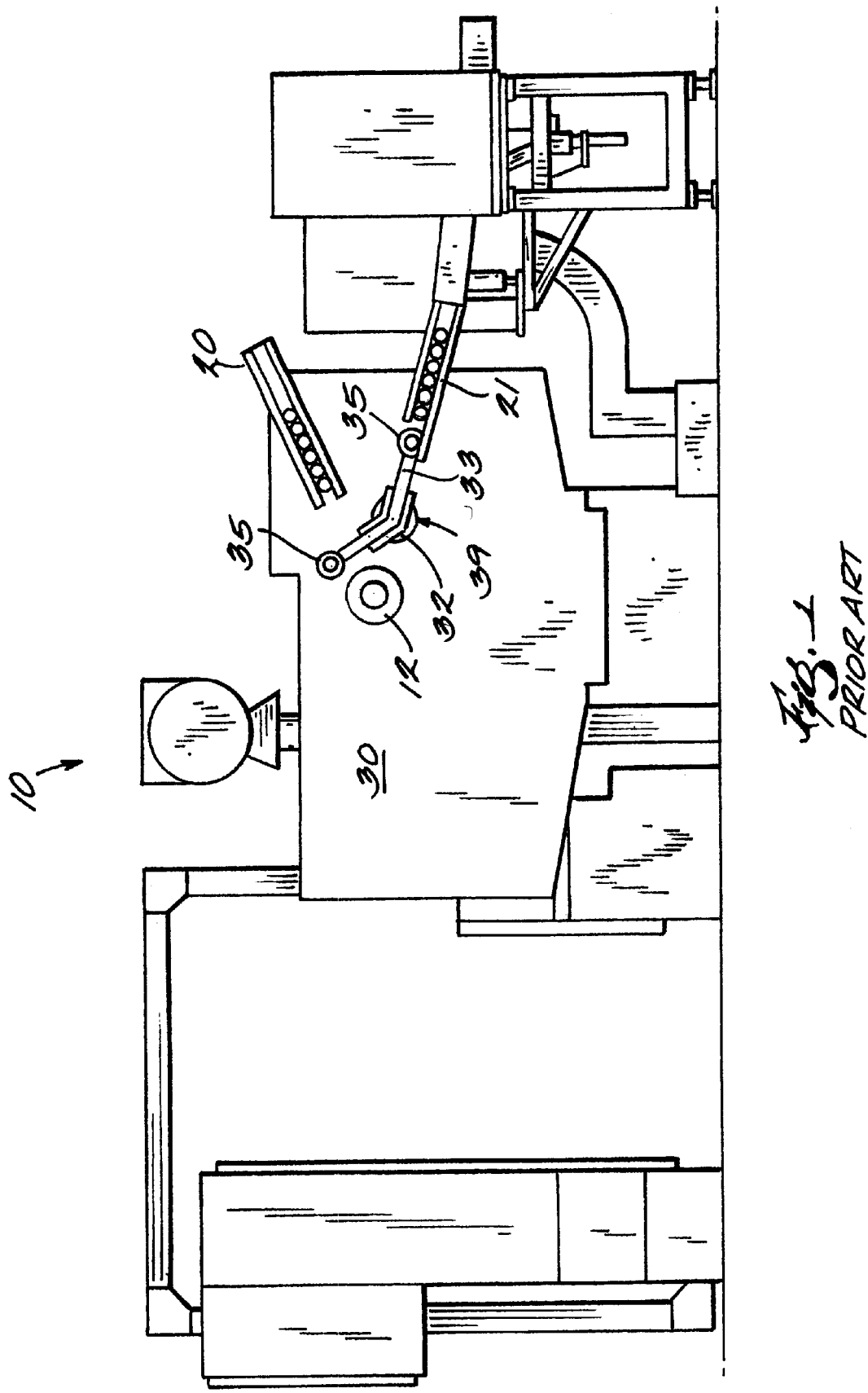

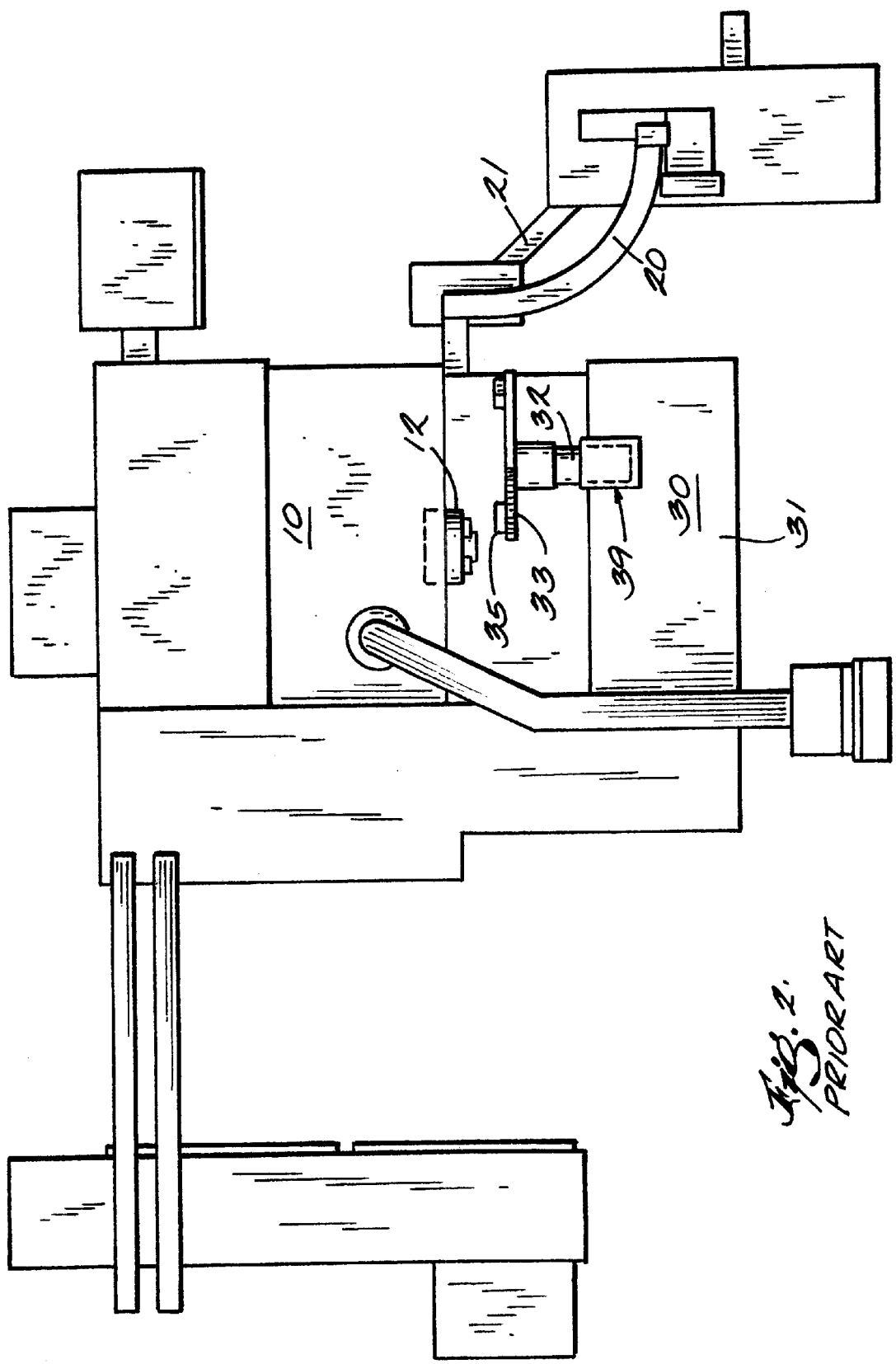

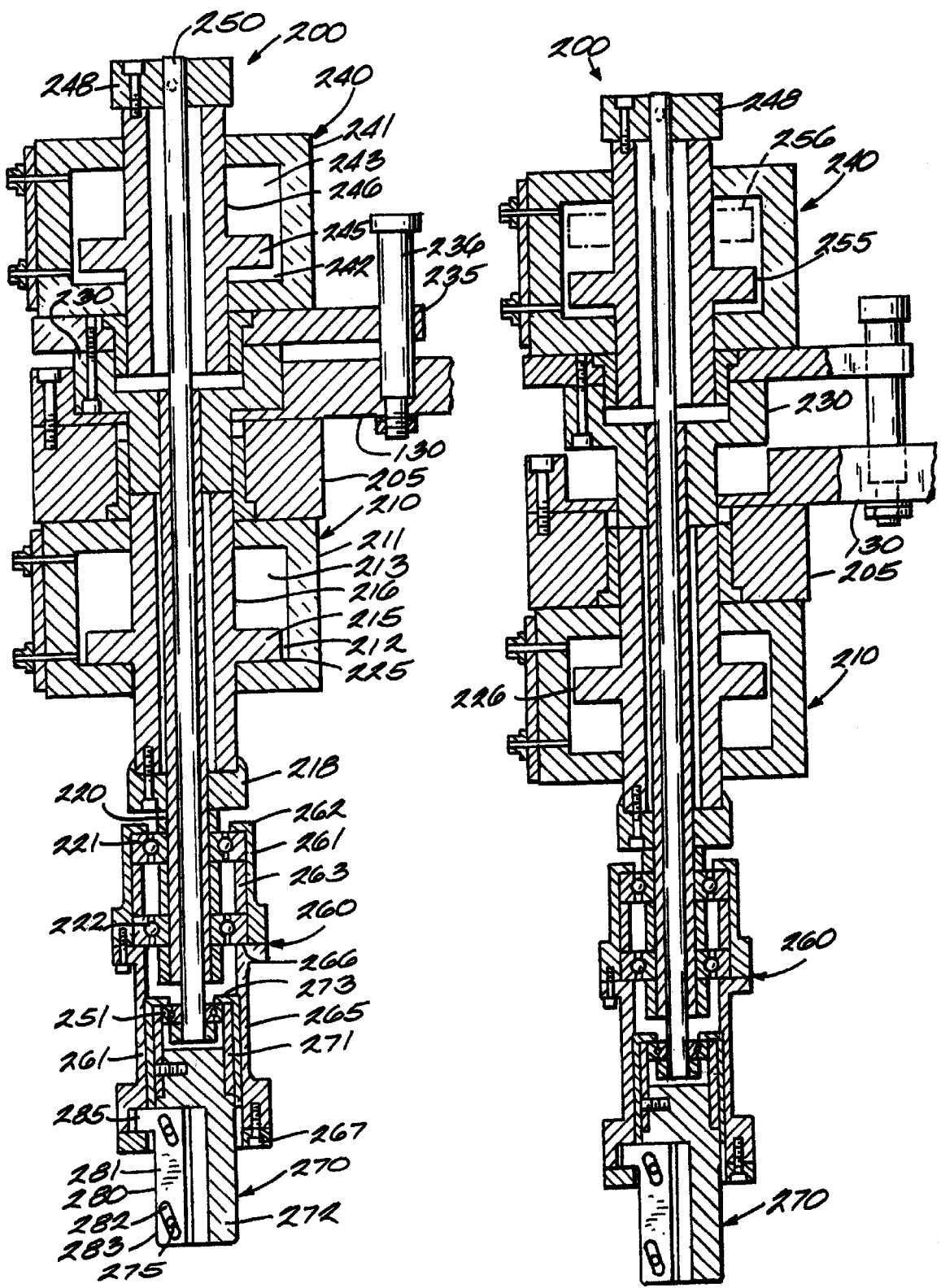

400  Process of annealing, grinding, and testing a gear piece 5.

MULTI-PURPOSE END EFFECTOR FOR A ROBOTIC ARM

BACKGROUND OF THE INVENTION

Multi-stage processes are commonly implemented in the manufacture of mechanical and electrical components such as gears, cams, pistons, rods, bolts, springs, fittings, circuit boards, capacitors, inductors, receivers, etc. For example, the process of manufacturing a gear from a gear blank may require the blank to pass through a drilling or boring stage where a central hole is rough bored through the flat face of the blank. The blank then passes through a stage where teeth are hobbed or otherwise formed along the outer radial perimeter of the blank. Some types of gears have hubs with threads. The gears are heat treated for hardness, and the threaded ends are annealed to relieve the stresses and brittleness caused by the heat treatment. The teeth and central hole are then precision ground so that the center of the pitch radius of the teeth coincides with the center of its hole.

Each manufacturing step or stage is performed by a separate machine or tool. For example, during a gear manufacturing operation, a gear blank is brought to a first station and loaded onto a first machine that performs a first task on the blank. The gear is then unloaded from the first machine, transported to a second station, and loaded on a second machine where another task is performed, and so on. This loading, machining, unloading and transporting process continues until each required task is complete.

One problem with multi-stage manufacturing operations is that they are often time consuming, labor intensive, and dangerous for the workers. The workers must walk by the machines when carrying heavy loads of workpiece, and load those parts into or onto the machines. Some machines contain fast moving and rotating parts. Other machines involve extremely hot temperatures or caustic acid baths. Hot shrapnel and caustic fluid is often thrown from the machines as the parts are drilled, sawed, ground, polished, and sprayed. Although shields are typically provided, they may not prevent all discharges, particularly if the shield is inadvertently left open. A worker that stands or walks in the wrong area, fails to put on proper safety attire, or accidentally slips, falls or leans against a machine can be severely hurt. Yet, safety precautions are inconvenient and frequently come at the expense of productivity. Workers may cut corners to meet or exceed desired productivity levels.

To speed up the manufacturing process and reduce labor requirements, stand-alone machines have been designed to hold a number of workpieces, and consecutively perform a single manufacturing process on those workpieces. For example, U.S. Pat. Nos. 2,329,301 and 3,728,829 disclose stand-alone, gear manufacturing machines that hold and dispense blanks through chutes to a position where a grinding or honing operation is performed to form the central bore of the gear. U.S. Pat. Nos. 3,533,258 and 4,106,632 disclose stand-alone machines that load gear blanks via chutes, and loading mechanisms that position the blanks into positions where a rolling operation is performed to form the teeth. In addition, U.S. Pat. No. 3,541,921 discloses an indexible, stand-alone, beveled gear cutting machine and control system that includes a three-armed turret. The turret picks up a gear piece from a first supply station, rotationally moves the piece to a first sequential station where a first finishing operation is performed, then move the piece to a second sequential station where a second finishing operation is performed, and finally return the gear piece to the supply station.

FIGS. 1–3 show a conventional gear grinding operation for gear pieces 5 having relatively flat side faces 6, a generally circular outer surface or perimeter 7 with uniformly spaced, precision cut teeth 7a, and an inner surface 9 that forms a rough cut central opening 9a. The gear pieces 5 are ground via a grinding machine 10 with a continuously rotating chuck 12 of the type shown in FIG. 4. The chuck 12 has three jaws or brackets 13. Each jaw 13 has a dog 14 and a locator tooth 16. As the dog 14 attempts to enter between the teeth 7a of the gear piece 5, it imparts rotation to the gear piece and syncronizes that rotation with the chuck 12 as shown in FIG. 5. Once the dog 14 has entered between two teeth 7a, the locator tooth 16 enters between two other teeth 7a. The jaws 13 then extend the locator teeth 16 to firmly grip the gear piece 5 as shown in FIG. 6. Once gripped, the locator teeth 16 align the gear piece 5 so that the central axis of the pitch diameter of the gear teeth 7a are aligned with the central axis of the grinding tool. Conveyors 20 and 21 supply gear pieces 5 to and discharge them from this manufacturing operation.

The grinding machine 10 is combined with a conventional, stand-alone, loading/unloading machine 30. The loading/unloading machine 30 has a frame 31 that supports a relatively large hydraulic or pneumatic expansion cylinder 32. The cylinder 32 supports a bar 33 formed in the shape of a boomerang with an angle of about 120°. Each end of the bar 33 has a gripping arm 35 for gripping one gear piece 5. One end of each gripping arm 35 is rigidly fixed to the bar 33. The other end of the gripping arm 35 has a sleeve 36 that is free to rotate about its central axis. The central expansion cylinder 32 drives the bar 33 and both gripping arms 35 toward and away from the grinding machine 10. The expansion cylinder 32, rotatable bar 33 and two gripping arms 35 form a loader/unloader unit 39.

A balloon-type gripping device 37 is situated around the outside of the rotatable sleeve 36 of each gripping arm 35 as shown in FIG. 3. The fixed end of the bar 33 has a pneumatic or hydraulic line that controls the balloon-type gripping device 36. The machine 30 inflates the balloon-type gripping device 36 to grip the inside surface of the central opening 9a of a gear piece 5, and deflates the device to let go of the gear piece. In an alternate embodiment, the balloon-type gripping device 37 is replaced with a locking ball and a plunger device.

As best shown in FIG. 1, the machine 30 rotates the bar 33 gripping arms 35 of the loader/unloader unit 39 in a clockwise or counterclockwise direction about the central axis of the expansion cylinder 32. The bar 33 rotates through a cycle in which each gripping arm 35 travels to a pick-up position, a load/unload position, and a discharge position. In the pickup position, one gripping arm 35 is aligned with a gear piece 5 on the supply conveyor 20. In the load/unload position, one gripping arm 35 is aligned with the rotating chuck 12 of the grinding machining 10. In the discharge position, one gripping arm 35 is aligned with the discharge conveyor 21.

During operation, the expansion cylinder 32 is used to horizontally extend and retract the bar 33 and gripping arms 35 at each of the pick-up, load/unload, and discharge positions. To pick-up a gear piece 5, one arm 35 of the gripping device 37 enters the central hole 9a of the gear piece 5 on the supply conveyor 20 and its balloon is inflated to grip that gear piece. The cylinder 32 is then retracted to pull the gripping arm 35 and gear piece away from the supply conveyor 20. To load a gear piece 5 onto the rotating chuck 12, the bar 33 rotates the gripping arm 35 and gear piece 5 into alignment with the rotating chuck 12. The expansion cylinder 32 then extends the rotatable sleeve 36, gripping device 37 and non-rotating gear piece 5 toward the chuck 12. The dog 14 of the chuck enters between the teeth 7 of the gear 5 to impart rotational movement to the gear, and the locator teeth 16 then enter between the teeth 7a. After the locator teeth 16 firmly grip the gear piece 5, the balloon is deflated to release that gear piece, and the cylinder 32 is retracted to pull the gripping arm 35 away from the chuck 12. To unload a gear piece 5 from the rotating chuck 12, the bar 33 rotates the empty gripping arm 35 into alignment with the rotating chuck 12 and gear piece 5. The expansion cylinder 32 then extends the rotatable sleeve 36 and gripping device 37 into the central hole 9a of the gear piece 5. The balloon type gripping device 37 is inflated to grip the gear piece 5, and the cylinder 32 is retracted to pull the gripping arm 35 and gear piece away from the chuck 12.

One problem with conventional stand-alone workpiece manufacturing machines is that each machine requires its own loading/unloading unit and supply and discharge conveyors. These loading/unloading units and conveyors are expensive, bulky and require a great deal of floor space. Each loading/unloading unit and conveyor also requires its own maintenance schedule. Should any part in the unit or conveyor jam or fail, the machine and the entire manufacturing operation may be shut down. Each time a worker goes near one of the loading/unloading units, the manufacturing operation must be shut down or the worker is exposed to possible injury.

Another problem with conventional, stand alone machines is that it is difficult to change over an assembly line using several machines to form a particular part. Each machine has to be set up to handle a workpiece of a particular size and shape. For example, in order to produce gears having a three-inch diameter, twenty-two teeth with a given pitch diameter and a one-inch diameter central hole, each stand-alone machine has to be adjusted to perform its specific task for this specific part. Then, the first machine in the assembly line must be loaded with specific gear blanks and processed. A substantial lag time can occur before the second and third machines in the process are ready to be filled with workpieces. In addition, many hours can be required to set up and test the accuracy of the machines. Manufacturing operations of this type are not conducive to small part runs, which are frequently required in the just-in-time manufacturing operations in use today.

A further problem associated with conventional, stand-alone, and indexible machines is that some manufacturing operations take longer than others. Indexible machines can only be incremented as quickly as it takes to complete the slowest machining operation. While only a few seconds may be needed to rough bore a hole in a gear piece, several minutes may be required to anneal that gear piece.

A still further problem with conventional stand-alone and indexible machines is that they do not incorporate gripping devices appropriate for a robotic application. Conventional machines impart specific types of movement on the workpieces they handle. For example, the above-noted conventional loader/unloader only imparts horizontal or rotational movement on the workpiece, but not at the same time. The gripping device only needs to grip the workpiece in such a way to avoid slipping from occurring during these specific movements. Accordingly, conventional loader/unloader units do not provide the secure grip needed when the parts are moved in a multi-directional path from one machine to another.

While robotics is well suited for some repetitive manufacturing operations, coordinating a robotic arm to go from machine to machine can be problematic. The robotic arms move quickly from one point to another, but have difficulty compensating when integrating tasks between different machines. For example, a machine that requires a degree of softness or compliance to load a workpiece onto a rotating tool or chuck is problematic for the rigid movements of the programmed robotic arm.

An additional problem associated with integrating a robot to work with several different machines is developing a practical end effector for such an activity. The speed and multi-directional movement of the robotic arm requires the end effector to be compact, balanced and light weight. An end effector that has excessive size or weight, or one that is unbalanced, will produce loads that will exceed the capacity of a given robotic arm. Accordingly, end effectors are typically designed to perform limited tasks and work with a specific machine. The robotic arm uses different end effectors to perform different tasks.

A further problem with both conventional robotic end effectors and conventional loader/unloaders is that they are not able to grip gear pieces having different sizes and shapes. The gripping mechanism on the loader/unloader has to be changed each time a different part run is made, which inhibits the ability to cost effectively produce smaller part runs.

The present invention is intended to solve these and other problems.

BRIEF DESCRIPTION OF THE INVENTION

This invention relates to a multi-purpose end effector for a robotic arm that moves a workpiece through an automated, multi-station, manufacturing operation. The end effector is particularly useful in a gear manufacturing operation in which a gear piece is annealed, ground and tested to ensure it meets desired specifications. The relatively lightweight and compact end effector securely grips the workpiece during multi-directional movements, and provides a degree of softness when loading the normally non-rotating workpiece onto a continuously rotating chuck or tool. The end effector is secured to the robotic arm by a cross-member equipped with three different gripping implements. A central gripping device extends from the middle of the cross-member, a loading arm extends from one end of the cross-member, and an unloading arm extends from the other end. Each gripping implement includes pneumatically controlled gripping fingers for holding the gear pieces. Each loading and unloading arm has a gripping cylinder and a rotatable sleeve for supporting its gripping mechanism. The loading arm has an extension cylinder for extending its gripping mechanism with a degree of softness or resiliency that helps prevent binding when the normally non-rotating workpiece engages the rotating chuck or tool.

One advantage of the present end effector invention is its versatility. The end effector is equipped with several different gripping implements that permit its use with a variety of machines. One implement or gripping device is capable of performing operations that require the robotic arm to pick up or place a workpiece on a stationary tool or rack. This gripping device is capable of gripping the inside or outside surface of a workpiece or object. The other two gripping implements have a rotating sleeve that allows them to unload a workpiece off a rotating tool or chuck. One of these two implement is also equipped with an extension cylinder that gives the otherwise rigid movement of the robotic arm a degree of softness or compliance. This allows the gripping implement to smoothly load a non-uniformly shaped workpiece, such as a gear with teeth on its perimeter, onto the jaws of a rotating chuck without binding. The versatility of the end effector allows the robotic arm to move quickly from machine to machine without slowing down to change end effectors, which greatly improves the overall speed of the robotic arm and the entire manufacturing operation.

Another advantage of the present end effector invention is that it allows the robotic arm to simultaneously handle the movements, and loading and unloading of workpieces as they proceed from machine-to-machine or operation-to-operation in a multi-station manufacturing process. This is accomplished even though different operations may take longer than others. One operation may be to pick up a first gear, move it to and align it with a rotating chuck of a grinding machine, and smoothly load the gear on the rotating chuck. While the grinding operation is being performed, the end effector can pick up a second gear on a holding rack and move it to another rack for a relatively long annealing operation, and then pick up a third gear. After the grinding operation is performed, the end effector can unload the first gear from the rotating chuck, and load the third gear on the rotating chuck. While the grinding and annealing operations are being performed, the end effector can move and load the first gear in another machine at another station. In this way, the end effector can simultaneously handle several gears at different stages of the manufacturing process, which greatly increases the speed and efficiency of the robotic arm and the automated manufacturing process.

A further advantage of the present end effector invention is its compact, lightweight and balanced design. The straddled, in-line arrangement of the gripping and extension cylinders in the loading arm produces a compact and balanced design that is well suited for robotic applications. The generally symmetrical layout of the three gripping implements provides a further degree of balance that reduces the stresses on the robotic arm.

A still further advantage of the present end effector invention is that it enables a multi-station manufacturing operation to be performed in a relatively small, organized area, and reduces the cost of maintaining the machines and their down time. Expensive, bulky, machine specific loading/unloading units are eliminated, as are the supply and discharge conveyors and numerous holding bins. This reduces the amount of maintenance time for the manufacturing operation, as well as down time and potential injury to workers.

A still further advantage of the present end effector invention is that it reduces set up time and costs in an automated manufacturing operation, thereby enabling a smaller number of parts to be manufactured in a given part run such as in a just-in-time manufacturing operation. Each station in the operation does not need to be supplied with workpieces ready for that particular stage of processing. Instead, a small number of workpieces can be sent through the manufacturing operation by allowing the robotic arm and end effector to distribute the parts from station to station so that several workpieces are being simultaneously processed by different machines.

A still further advantage of the present end effector invention is that its gripping mechanisms are appropriate for a robotic application. The loading and unloading arms are each equipped with a pneumatic gripping cylinder that combines with a gripping mechanism with a mechanical lever to provide sufficient force to securely hold the workpiece as the robotic arm moves quickly through a variety of multi-directional movement patterns. This secure grip ensures the gear piece will remain in its desired gripped position on the end effector so that the robotic arm can accurately align the workpiece at the next station.

A further advantage of the present end effector invention is that it is able to grip and move a variety of gear pieces having different sizes and shapes. The gripping mechanisms on the end effector permit a wide range of motion of its gripping fingers. The same gripping mechanisms can be used in a variety of gear piece runs. This speeds up the time to change from one part run to another, and improves the machines ability to make the smaller part runs frequently found in a just-in-time manufacturing operation.

Other aspects and advantages of the invention will become apparent upon making reference to the specification, claims and drawings.

BRIEF DESCRIPTION OF THE DRAWINGS

FIG. 1 is a front view of a conventional stand-alone loading/unloading machine equipped with an end effector having a central expansion cylinder that supports the middle of a bar with gripping arms at each end, one arm being at a discharge position.

FIG. 7 is an overhead view of an automated, multi-stage gear manufacturing station with a robot with its arm extended toward a grinding tool, and unloading arm aligned to remove a gear from the rotating chuck of the grinding tool.

FIG. 11 is a side view of the loading arm showing its gripping cylinder in its gripping position and its extending cylinder in its retracted position.

FIG. 12 is a side view of the loading arm with its extension cylinder shown in an extended position.

DESCRIPTION OF THE PREFERRED EMBODIMENT

While this invention is susceptible of embodiment in many different forms, the drawings show and the specification describes in detail a preferred embodiment of the invention. It should be understood that the drawings and specification are to be considered an exemplification of the principles of the invention. They are not intended to limit the broad aspects of the invention to the embodiment illustrated.

Figure 8:
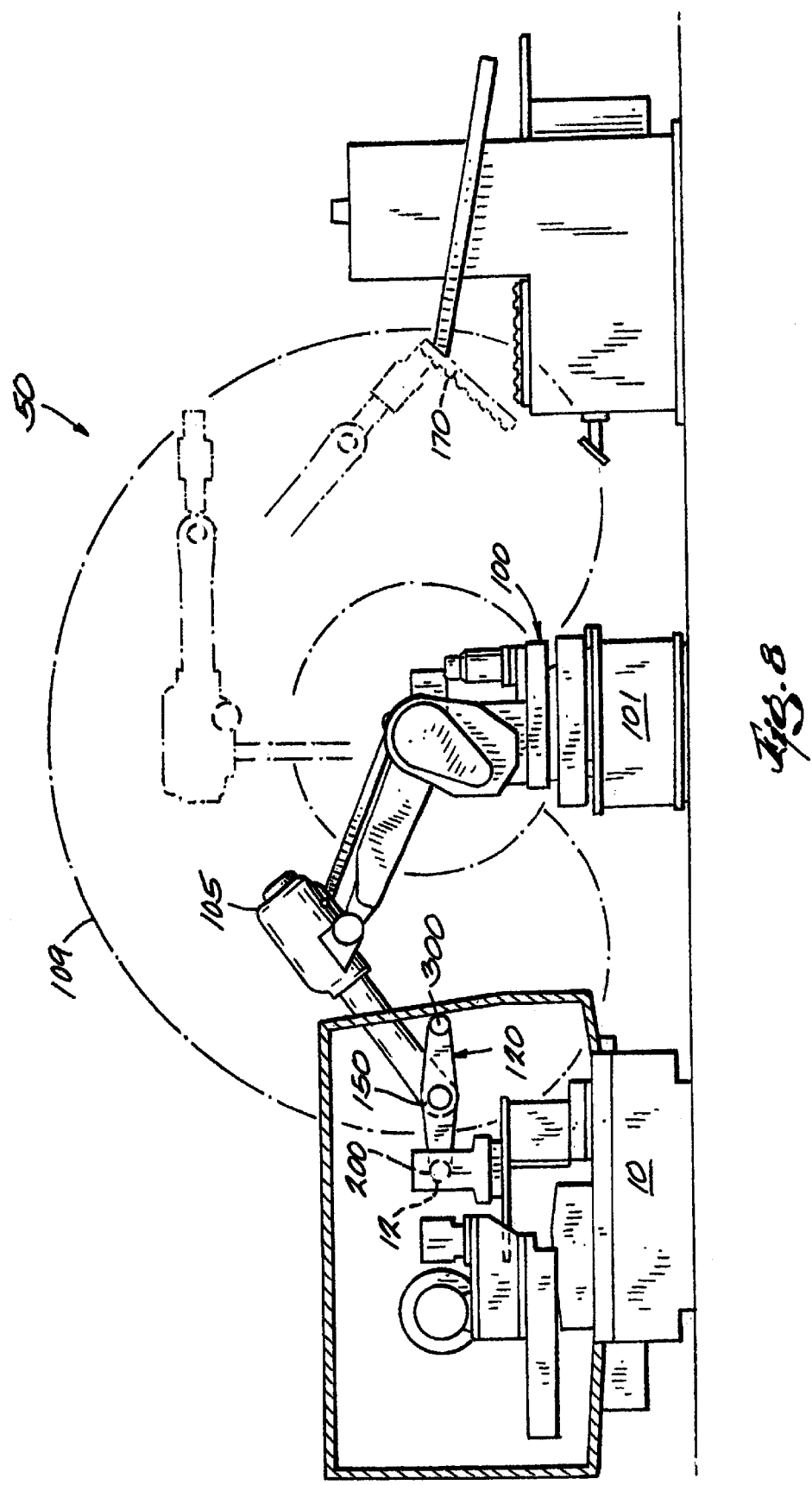
FIG. 8 is an elevated, side view of the multi-station gear manufacturing operation showing the possible paths of travel of the robotic arm and end effector as they move from station-to-station.

The present invention relates to a multi-station manufacturing operation 50, such as the gear piece 5 annealing, grinding and testing operation shown in FIGS. 7 and 8. As noted above, each gear piece 5 has front and rear faces 6, an outer surface or perimeter 7 with uniformly spaced teeth 7a, and an inner surface 9 forming a central opening 9a. A portion of the inner surface 9 of the gear pieces 5 may be threaded. The manufacturing operation 50 cycles the gear pieces 5 through a variety of stations. To protect workers from shrapnel, caustic fluid and moving equipment parts, a protective wall 51 is constructed around the restricted work area of the manufacturing operation 50.

Figure 3:
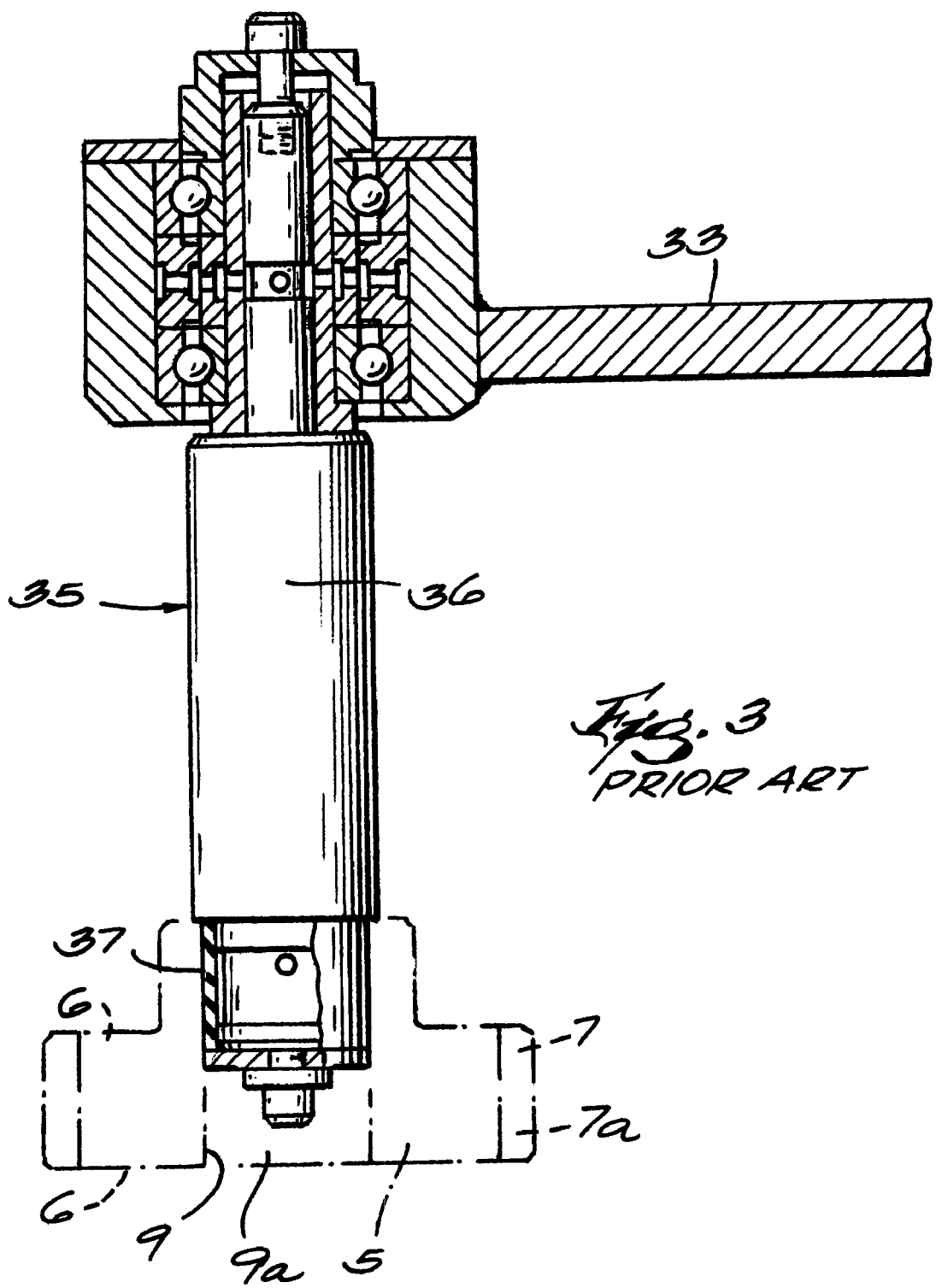
FIG. 3 is a cross sectional view of the gripping arm of the conventional loading/unloading device having a rotatable sleeve with a balloon-type gripping device.
Figure 4:
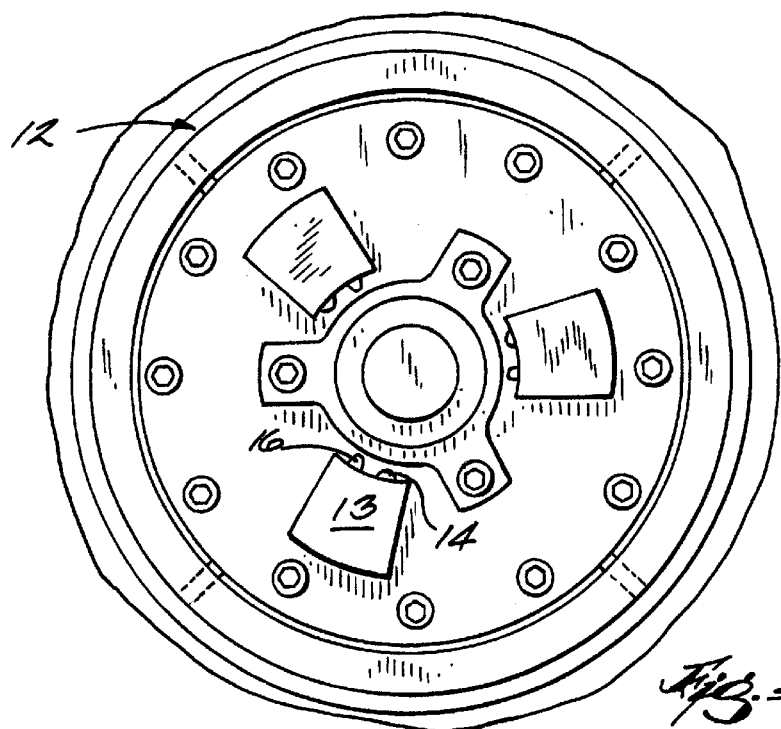
FIG. 4 is a front view of a conventional, three jaw, rotating chuck, each jaw having a dog and a locator tooth for engaging a gear.
Figure 5:
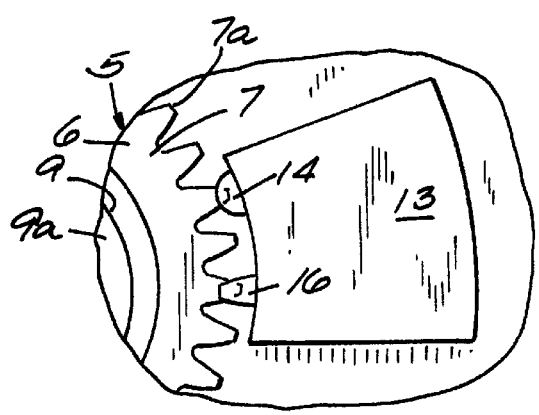
FIG. 5 is a front view showing a non-rotating gear as it is being loaded on the rotating chuck, the dog and locator tooth of the chuck being out of alignment with the teeth of the gear.
Figure 6:
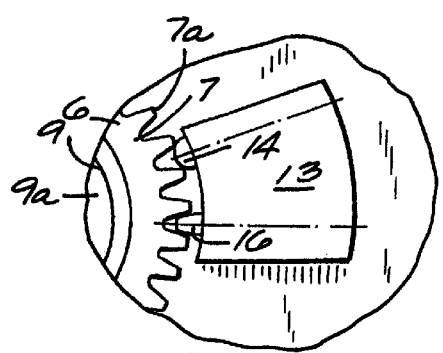
FIG. 6 is a front view of a gear loaded on the rotating chuck with the dog and locator tooth of the chuck aligned between the teeth of the gear.
Figure 2:
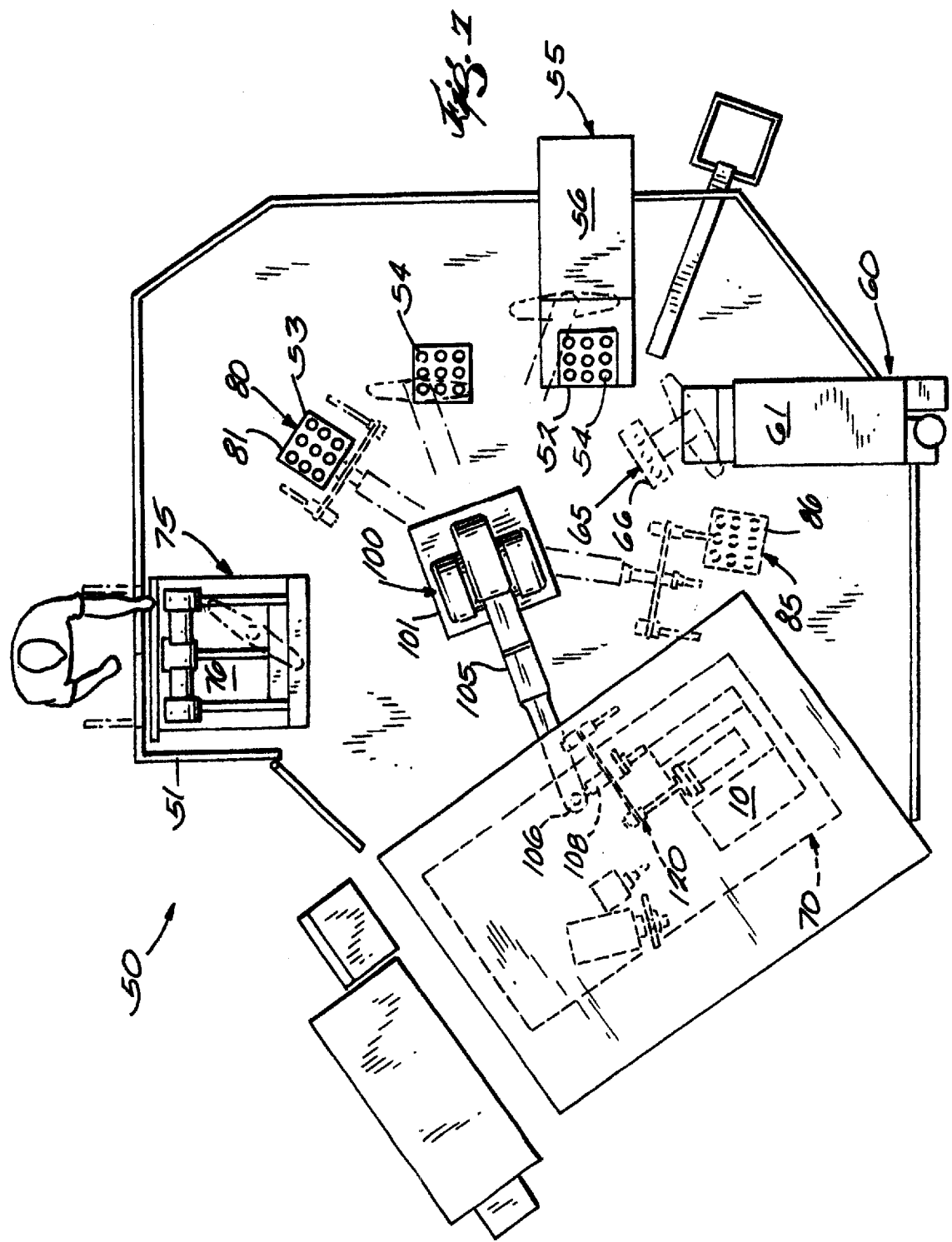
FIG. 2 is a top view of the conventional stand-alone loading/unloading machine with one of the gripping arms at a loading/unloading position.

Gear pieces 5 are initially brought to the manufacturing operation 50 on steel trays 52 or plastic racks 53. Each tray 52 or rack 53 has an array of uniformly spaced posts 54. Each gear is placed on the tray 52 so that one post 54 extends through the center opening 9a of a gear piece 5 to hold it in place. The trays 52 are brought to a supply station 55 with a bin or magazine 56 that is accessible from outside the protective wall 51. The magazine 56 moves the tray 52 inside the manufacturing operation 50 and orients the tray so that each post 54 and gear piece 5 is located at specific coordinates. The gear pieces 5 are then moved to an annealing station 60 and placed on the posts of the rack 53 at the annealing machine 61. After annealing, the gear pieces 5 are moved to a cooling station 65, and placed at a specific location on a cooling rack 66. Once cooled, the gear pieces 5 are brought to a grinding station 70 with a conventional center hole grinding machine 10 as shown in FIGS. 1–3. The gear pieces 5 are loaded onto the continuously rotating chuck 12 of the machine 10. After grinding, the gear pieces 5 are unloaded from the grinding machine 10 and brought to a testing station 75 where they are placed on a testing machine 76. If the gear piece 5 tests satisfactory, it is brought to a completion station 80, and placed on a rack 53 of a cart 81. After the racks 53 in the cart 81 are full, the cart 81 and gear pieces 5 are then removed for further processing or shipment. A regripping station 85 may also be provided to allow the robot 100 to move the gear piece 5 from one of its three implements to the other, as discussed below.

A robot 100 cycles the gear pieces 5 through the multi-station manufacturing operation 50. The robot is preferably mounted to the floor via its base or platform 101, and includes a multi-piece arm 105 with an end 106. The end 106 includes a cylindrically shaped, rotatable mount 108 for securing a tool or attachment. The mount 108 includes electrical connections and pneumatic lines (not shown) for connecting to the tool or attachment. The pneumatic lines typically supply about 80 to 100 pounds per square inch of pressure. The base 101, multi-piece arm 105 and mount 108 are conventional in nature. The robot 100 is located toward the middle of the operation 50 with the various stations being located around the robot in a generally circular pattern at a distance that allows its end 106 to reach each station. The robotic arm 105 is capable of moving in multi-directional paths of travel 109. The robot 100 is programmed to simultaneously cycle several gear pieces 5 through the operation 50 as discussed below.

Multi-Purpose End Effector

The robot 100 is equipped with a multi-purpose end effector 120. The end effector 120 includes three different implements for gripping and handling the gear pieces 5 and plastic racks 53. As discussed below, the gripping implements include a gripping device 150, a loading arm 200, and an unloading arm 300.

Figure 9:
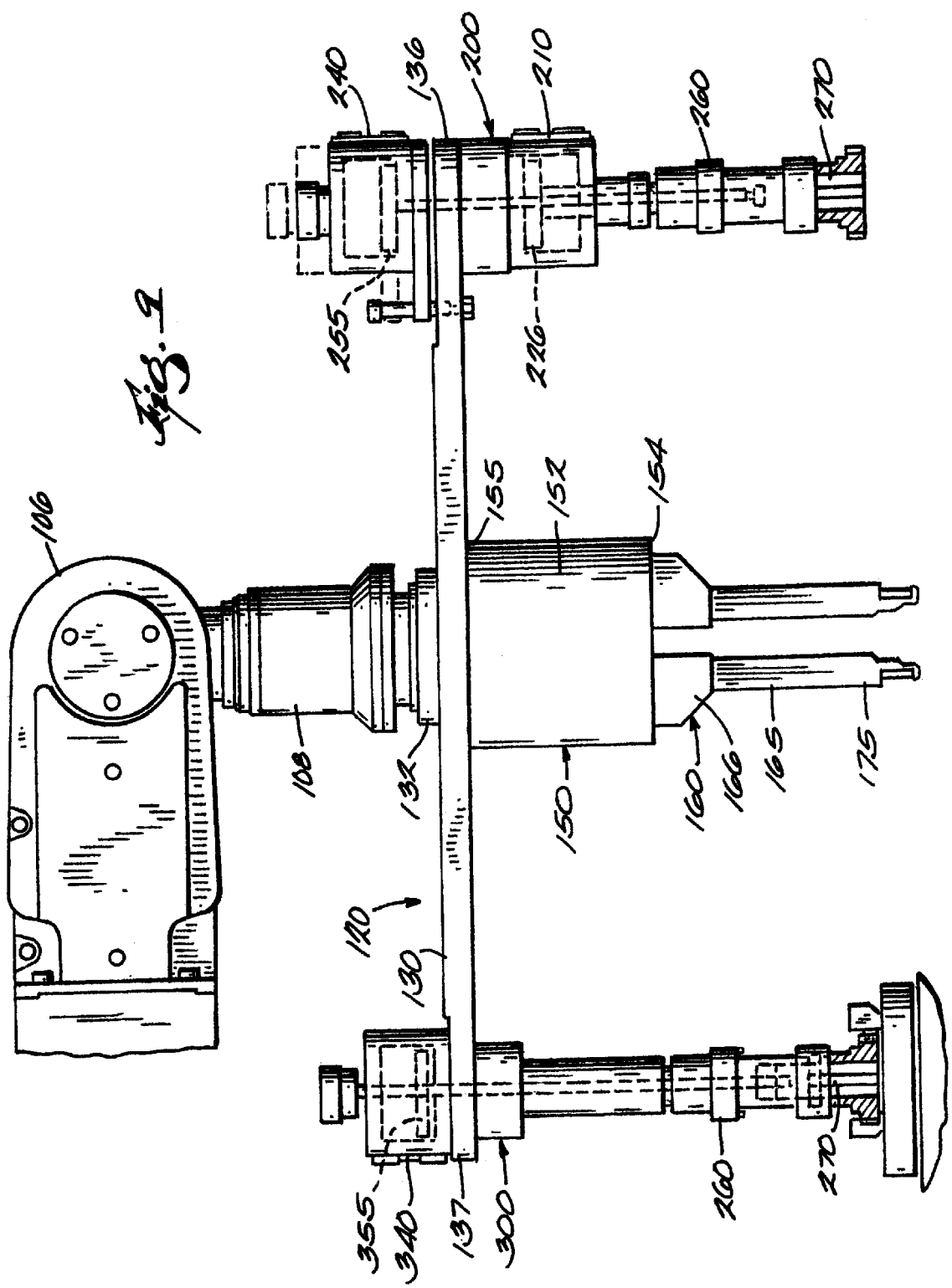
FIG. 9 is a top view of the multi-purpose end effector having a cross-member that supports a central gripping device, a loading arm and an unloading arm, the unloading arm being in its extended position to grip the rotating gear piece held by the rotating chuck.
Figure 10:
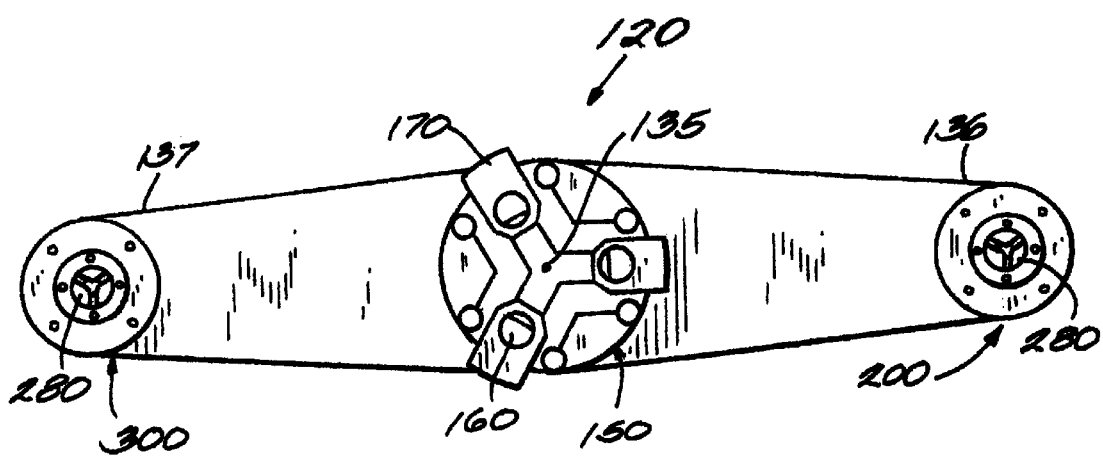
FIG. 10 is a front view of the multi-purpose end effector shown in FIG. 9.

As best shown in FIGS. 9 and 10, an elongated cross-member or spacing bracket 130 supports and spaces the gripping implements 150, 200 and 300 apart so that each is capable of moving to a particular station and engaging a gear piece 5 without interference from the others. The cross-member 130 is bolted or otherwise rigidly secured to the mounting bracket 108 of the robotic arm 105 via a circular mounting plate 132. The cross-member 130 is robustly sized to support the implements 150, 200 and 300, and is wider towards its middle section 135 and tapers towards its ends 136 and 137. The cross-member 130 is made of aluminum, and trapezoidal openings are formed in the wings of the cross-member 130 to reduce its mass and weight. A circular hole is formed in the middle 135 of the cross-member 130. One circular hole is also formed toward each end 136 and 137 of the cross-member 130. The end holes are equidistant from middle 135 of the cross-member 130.

The central gripping device 150 is a conventional three jaw parallel gripper driven by a dual action cylinder, such as that made by CCMOP of Paris, France. The gripping device 150 has a generally cylindrical housing 152 with front and rear ends 154 and 155. The housing 152 forms an internal cylinder. The rear end 155 of the housing 152 is snuggly received by the hole in the middle 135 of the cross-member 130, and is bolted or otherwise rigidly secured to the cross-member 130 and mounting plate 132. The central axis of the gripping device 150 is linearly aligned with the central axis of the cylindrical mounting bracket 108 of the robot 100. The front end 154 of the housing 152 includes a gripping mechanism 160 with three movable fingers 165. The fingers have a 25 millimeter stroke that gives them a great amount of versatility. The fingers 165 can be extended to an outer gripping position 170 to grip the outside surface 7 of the gear pieces as in FIG. 9, or they can be retracted to an inner gripping position 175 for gripping the inside surfaces 9 of the holes in the gear pieces 5 or the racks 53 as in FIG. 8. The robot 100 includes a regulator (not shown) that controls the amount of pressure supplied to the chambers of the gripping device 150 to regulate the gripping force of the fingers 165.

The gripping device 150 includes a piston and rod assembly (not shown) that divides its internal cylinder into a front and a rear chamber. The pneumatic lines of the robot 100 are in controlled communication with the chambers. A switch (not shown) opens and closes the flow of air to the chambers. When one chamber is pressurized its release valve is closed and the release valve for the other chamber is opened. The pressurization of the rear chamber advances the piston toward the front of the housing 152. The pressurization of the front chamber pushes the piston back toward the rear of the housing 152. The piston rod is pivotally linked to the jaws or base portions 166 of the fingers 165. Forward advancement of the rod pushes the jaws 166 outwardly through lateral slots and spreads the fingers 165 apart. Backward movement of the rod pulls the jaws 166 inwardly through the lateral slots to close the fingers 165 together.

The loading arm 200 is securely bolted to the cross-member 130 via a donut shaped mounting collar 205 that is bolted around the front of the hole toward the end 136 of the cross-member as shown in FIGS. 11 and 12. A pair of pneumatic cylinders 210 and 240 straddles the cross-member 130. The cylinders are conventional pneumatic cylinders with a three inch bore and a one inch stroke, such as those made by Compact Air Products, Inc. of Westminster, S.C. The centerlines of the arm 200 and cylinder 210 and 240 pass through the center of the hole. This straddled, in-line arrangement produces a compact arm 200 that is relatively lightweight and balanced on the cross-member 130. The loading and unloading arms 200 and 300 are equidistant from the middle 135 of the cross-member 130 to further improve the balance of the end effector 120. This lightweight and balanced design reduces the torque and other forces on the robotic arm 105.

The extension cylinder 210 is formed by a cylindrical housing 211 with front and rear ends and a hollow interior. The housing 211 is securely bolted to the mounting collar 205. The interior is divided into front and rear chambers 212 and 213 by a piston 215. The pneumatic line of the robot 100 is in controlled communication with both chambers 212 and 213. A switch (not shown) opens and closes the pneumatic line to the chambers. When chamber 212 is pressurized, its release valve is closed and the release valve of chamber 213 is open. Alternately, when chamber 213 is pressurized, its release valve is closed and the release valve of chamber 212 is open. The pressurization of the rear chamber 213 pushes the piston 215 toward the front of the housing 211. The pressurization of the front chamber 212 pushes the piston back toward the rear of the housing 211. The robot 100 has a separate regulator for controlling the pressurization of chamber 213 to produce a relatively slow and soft extension of the gripping piston 215.

The piston 215 has an integrally molded sleeve 216 that extends axially from both the front and rear sides of the piston. The sleeve 216 passes through the front and rear walls of the cylindrical housing 211. Seals prevent air leakage between the housing 211 and the sleeve 216. The front portion of the sleeve 216 is covered by a cap 218. The cap 218 is securely bolted to the end of the sleeve 216. The piston 215, sleeve 216 and cap 218 form a central tubular opening for receiving a hollow shaft 220. The front end of the hollow shaft 220 passes through and extends out of the cap 218. A pair of spaced axial bearings 221 and 222 is secured to the front end of the hollow shaft 220. The hollow shaft 220 is pinned or otherwise rigidly secured to the cap 218. The piston 215 is movable between a forward or extended position 225 as shown in FIG. 11, and a rearward or retracted position 226 as shown in FIG. 12. The hollow shaft 220 moves with the piston 215.

An interior or middle hub 230 is pinned or otherwise rigidly secured to the rear end of the hollow shaft 220, so that it also moves with the piston 215. The middle hub 230 is received inside and is slidingly supported by the donut shaped collar 205 via a bushing. A torque or anti-rotational plate 235 is securely bolted to the rear end of the middle hub 230. The plate 235 has a notch for slidingly receiving a pin 236 extending from the rear of the cross-member 130. The anti-rotational plate 235 and pin 236 prevent the rotation of the piston 215, hollow shaft 220 and middle hub 230.

The gripping cylinder 240 is similar in construction and operation to the extension cylinder 210. The gripping cylinder 240 has a cylindrical housing 241 with a hollow interior. The housing 241 is securely bolted to and supported by the middle hub 230 so that it moves with the piston 215 of the extension cylinder 210. The interior of the cylinder 240 is divided into front and rear chambers 242 and 243 by a piston 245. The pneumatic line of the robot 100 is in controlled communication with both chambers 242 and 243. A switch (not shown) is activated by the robot to open and close the pneumatic line to these chambers 242 and 243. When chamber 242 is pressurized by the pneumatic line, its release valve is closed and the release valve of chamber 243 is open. Alternately, when chamber 243 is pressurized by the pneumatic line, its release valve is closed, and the release valve of chamber 242 is open. The pressurization of rear chamber 243 pushes the piston 245 toward the front of the housing 241. The pressurization of the front chamber 242 pushes the piston 245 back toward the rear of the housing 241. The piston 245 has an integrally molded sleeve 246 that extends from both the front and rear of the piston. The sleeve 246 passes through the front and rear walls of the housing 241. Seals prevent air leakage between the housing 241 and the sleeve 246. The rear portion of the sleeve 246 is covered by a cap 248 that is securely bolted to the sleeve 246. The piston 245, sleeve 246 and cap 248 form a central tubular opening for receiving a solid shaft 250. The rear end of the shaft 250 is pinned or otherwise rigidly secured to the cap 248. The front end of the solid shaft 250 passes through and extends from the hollow shaft 220. The front end of the shaft 250 is supported by an axial thrust bearing 251.

A rotatable sleeve 260 and a gripping mechanism 270 are secured to the front end of the loading arm 200. The rotatable sleeve 260 has a housing formed by upper and lower hubs 261 and 265 and a cap 267 that are securely bolted together. The lower hub 261 is supported by spaced, axial bearings 221 and 222 fixed to the outside of hollow shaft 220. The axial bearings 221 and 222 and a spacer 263 are sandwiched between an inner rim 262 of the lower hub 261 and a lip 266 formed by the slightly smaller inside diameter of the upper hub 265. This sandwiched construction secures the rotatable sleeve 260 to the hollow shaft 220, while permitting free axial rotation of the sleeve.

The gripping mechanism 270 is formed by a glide 271 and gripping fingers 280. The glide is snuggly received inside upper hub 261, and is free to slide axially in the hub via a bushing. The axial thrust bearing 251 of the solid shaft 250 engages and rotatably supports the glide 271. The glide 271 is firmly pinned to a draw bar 272. The thrust bearing 251 of the solid shaft 250 is sandwiched between the draw bar 272 and a rim 273 of the glide 272, so that the glide 271 and draw bar 272 move in unison with the solid shaft 250. The draw bar 272 has four longitudinal channels, each of which receives one finger 280. Two pins 275 extend from the draw bar 272 into each channel. Each channel is shaped to snuggly receive a longitudinal portion 281 of one gripping finger 280. Each longitudinal portion 281 has two angled slots 282 for receiving the two pins 275 associated with the channel in which it fits. A lateral portion 285 of the gripping fingers 280 is restricted from longitudinal movement by the cap 267 of the rotatable sleeve 260. The slots are sloped about ten degrees from the centerline of the loading arm 200 to produce a mechanical lever that accentuates the gripping force of the fingers due to the pressure exerted on the gripping piston 215.

When the piston 245 of the gripping cylinder 240 moves forward to its extended position 255, the solid shaft 250 pushes the draw bar 272 forward while the gripping fingers 280 are held longitudinally fixed by the cap 267 of the rotatable sleeve 260. This causes the slots of the gripping fingers 280 to ride up the pins 275 of the draw bar 272, thus spreading the finger apart so that the outside surface 283 of the fingers 280 grips the inside surface 9 of the gear piece 5. When the piston 245 of the gripping cylinder 240 moves back to its retracted position 256, the solid shaft 250 pulls the draw bar 272 back while the gripping fingers 280 are again held longitudinally fixed by the lip 266 of lower hub 265 of the rotatable sleeve 260. This causes the slots of the gripping fingers 280 to ride down the pins 275 of the draw bar 272, thus moving the fingers together to release the grip on the inside surface 9 of the gear piece 5.

Figure 13:
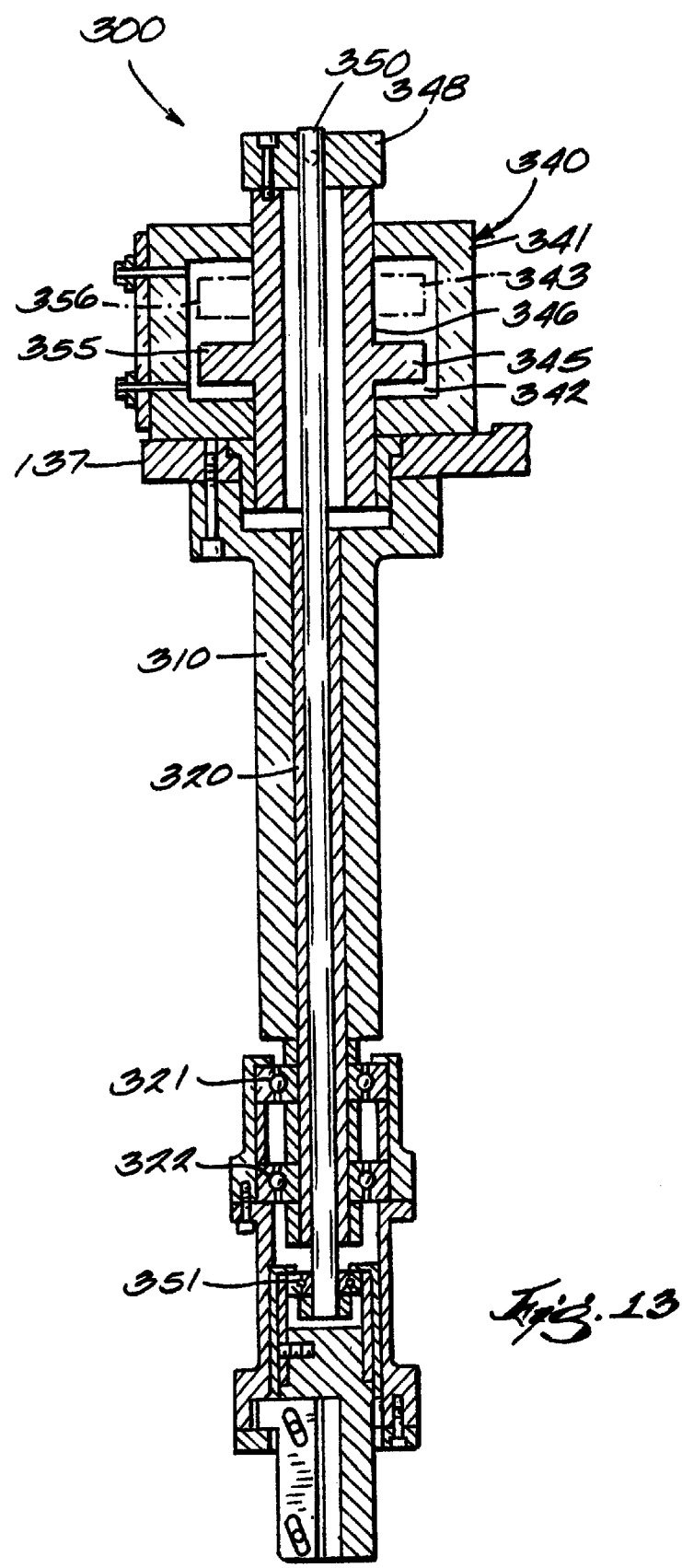
FIG. 13 is a side view of the unloading arm showing the gripping cylinder and mechanism in their gripping position.

The unloading arm 300 differs from loading arm 200 in some respects as shown in FIGS. 9 and 13. A spacing tube 310 and a hollow tube 320 replace the mounting collar 205, extension cylinder 210, middle hub 230 and anti-rotation plate 235. The spacing tube 310 is securely bolted around the front of the hole of the cross-member 130 at end 137. The front end of the spacing tube 310 extends the same distance forward from the cross-member 130 as the cap 218 of the piston 215 of the extension cylinder 210. The hollow tube 320 is dimensionally equivalent to the hollow shaft 220, and is securely pinned or otherwise rigidly attached to the inside of the spacing tube 310. Axial bearings 321 and 322 are secured to the outside of the hollow tube 320. These bearings 321 and 322 are equivalent to axial bearings 221 and 222.

The gripping cylinder 340 is structurally and operationally equivalent to the gripping cylinder 240 of the loading arm 200. The gripping cylinder 340 has a cylindrical housing 341 that is securely bolted around the rear of the hole in the cross-member 130 at end 137. The interior of the cylinder 340 is divided into front and rear chambers 342 and 343 by a piston 345. The pneumatic line of the robot 100 is in controlled communication with both chambers 342 and 343. A switch (not shown) is activated by the robot to open and close the pneumatic line to these chambers. When chamber 342 is pressurized by the pneumatic line, its release valve is closed and the release valve of chamber 343 is open. Alternately, when chamber 343 is pressurized by the pneumatic line, its release valve is closed, and the release valve of chamber 342 is open. The pressurization of rear chamber 343 pushes the piston 345 toward the front of the housing 341. The pressurization of the front chamber 342 pushes the piston 345 back toward the rear of the housing 341. The piston 345 has an integrally molded sleeve 346 that extends from both the front and rear of the piston. The sleeve 346 passes through the front and rear walls of the housing 341. Seals prevent air leakage between the housing 341 and the sleeve 346. The rear portion of the sleeve 346 is covered by a cap 348 that is securely bolted to the sleeve. The piston 345, sleeve 346 and cap 348 form a central tubular opening for receiving a solid shaft 350. The rear end of the shaft 350 is pinned or otherwise rigidly secured to the cap 348. The front end of the solid shaft 350 passes through and extends from the hollow tube 320. The front end of the shaft 350 is supported by an axial thrust bearing 351.

The Rotatable sleeve 260 and gripping mechanism 270 of the loading and unloading arms 200 and 300 are interchangeable. When the piston 345 of the gripping cylinder 340 moves forward to its extended position 355, the solid shaft 350 pushes the draw bar 272 forward while the gripping fingers 280 are held longitudinally fixed by the cap 267 of the rotatable sleeve 260. This causes the slots 282 of the gripping fingers 280 to ride up the pins 275 of the draw bar 272, thus spreading the finger apart so that the outside surface 283 of the fingers 280 grips the inside surface 9 of the gear piece 5. When the piston 345 of the gripping cylinder 340 moves back to its retracted position 356, the solid shaft 350 pulls the draw bar 272 back while the gripping fingers 280 are again held longitudinally fixed by the lip 266 of lower hub 265 of the rotatable sleeve 260. This causes the slots 282 of the gripping fingers 280 to ride down the pins 275 of the draw bar 272, thus moving the fingers together to release the grip on the inside surface 9 of the gear piece 5.

Operation of Robotic Arm and Multi-Purpose End Effector

Figure 14:
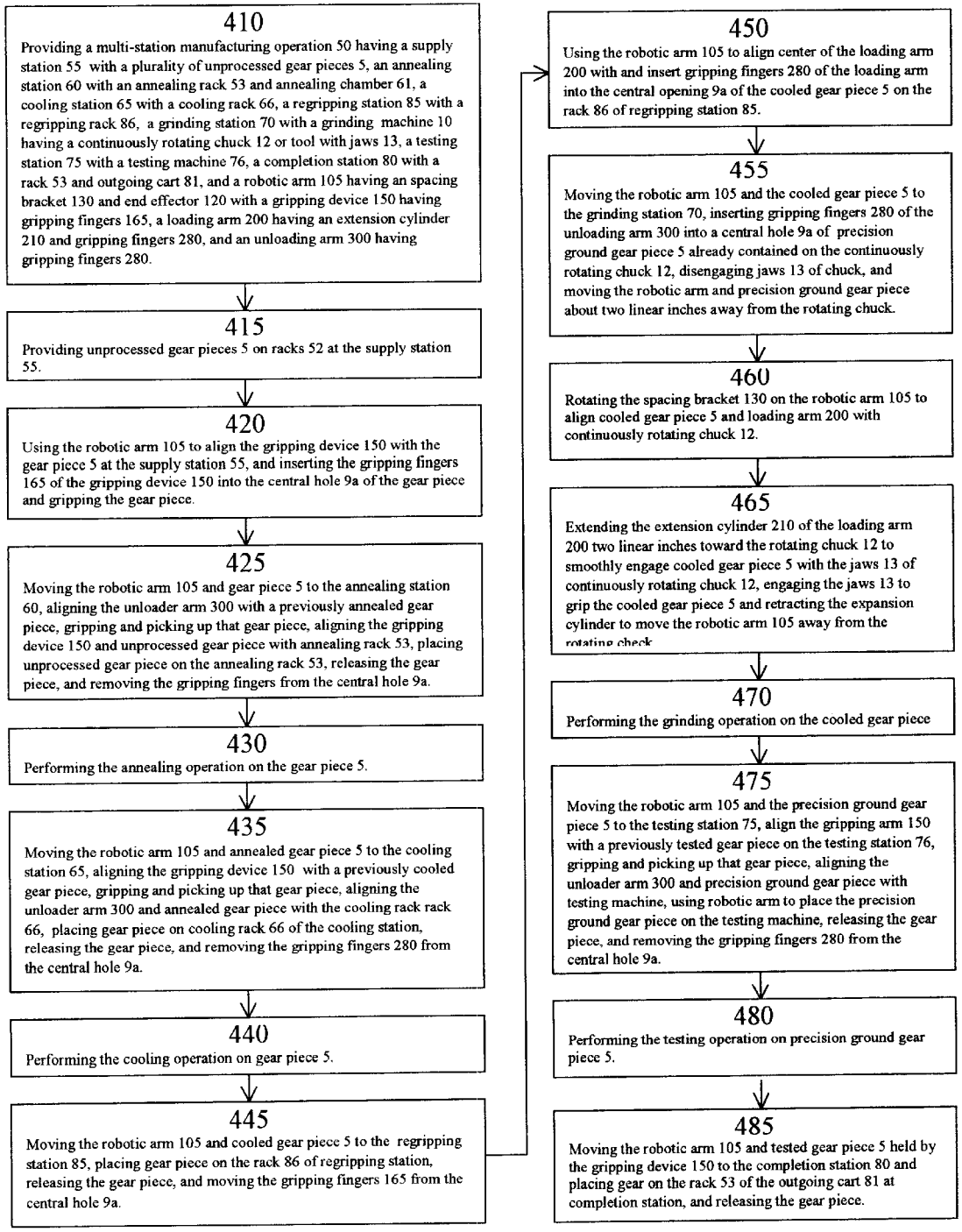
FIG. 14 is a flow chart showing the process of using the robot and end effector to load, unload and transport gear pieces through a multi-stage gear manufacturing operation.

Although the following should be understood given the above discussion, the following is provided to assist the reader in understanding the operation of the robotic arm and end effector in the preferred embodiment. The process of annealing, grinding and testing gear pieces 400 is shown in FIG. 14. As noted above, the first step 410 is to provide a multi-station manufacturing operation 50 with several stations 55, 60, 65, 70, 75, 80 and 85 and racks or machines 56, 61, 66, 71, 76, 81 and 86. Unprocessed gear pieces 5 are initially brought in on steel trays 52 or plastic racks 53 as in step 415. The trays 52 are brought to the supply station 55 and placed in the magazine 56 that automatically moves the tray inside the restricted work area. Magazine 56 orients the tray 52 and its posts 54 so that each gear piece 5 is located at specific coordinates known to the robot 100.

The next steps 420 and 425 are to use the robot 100 and gripping device 150 to pick up one of the unprocessed gear pieces 5 from the tray 52 at the supply station 55, and move the gear piece 5 to the annealing station 60. At the annealing station 60, the robot 100 uses unload arm 300 to pick up a previously annealed gear piece 5 from one of the posts 54 on the rack 53 at that station, and places the unannealed gear piece on one of the posts of that rack. While the unannealed gear piece 5 is being processed in step 430, the robot 100 moves the annealed gear piece to a cooling station 65, uses the gripping device 150 to pick up a previously cooled gear piece 5 from one of the posts of the rack 66 at that station, and places the uncooled gear piece on one of the posts of that rack as in step 435. While the uncooled gear piece 5 is cooling in step 440, the robot 100 takes the cooled gear piece 5 to the regripping station 85 where it transfers the gear piece to its loading arm 200 in steps 445 and 450.

The robotic arm 105 then proceeds to the grinding station 70 in step 455. The grinding station 70 includes a conventional center hole grinding machine 10, less the conveyors 20 and 21 and stand-alone loader/unloader 30 shown in FIGS. 1–3. As noted above, the grinding machine 10 includes a continuously rotating chuck 12 that grips the teeth 7a of the gear piece 5 during the grinding operation. The robot 100 aligns the unloading arm 300 in front of the rotating chuck 12, and moves the end effector 120 forward to insert its retracted gripping mechanism 270 into the center hole 9a of the gear piece 5 rotating on chuck 12. The robot 100 then pressurizes the rear chamber of the gripping cylinder 340 to grip the gear piece 5. This causes the gripping fingers 280 to firmly engage the rotating gear 5, which results in the rotation of its sleeve 260. After the chuck 12 releases the gear piece 5, the robot 100 moves the entire end effector 120 and arm 300 a short linear distance away from the chuck 12 while still maintaining its alignment with the chuck. The robot 100 then rotates the mount 108 180° to position the loading arm 200 in front of the chuck 12 as in step 460, and pressurizes the rear chamber of the extension cylinder 210 to move its gear piece 5 into engagement with the chuck as in step 465. After the gear piece 5 is loaded on the chuck 12, the robot 100 pressurizes the front chambers of the gripping cylinder 240 to release its grip on the gear piece 5. The robot then pressurizes front chamber of the extension cylinder 210 to move the gripping mechanism 270 away from the rotating gear piece 5 and chuck 12.

While the grinding machine 10 grinds the gear piece on its chuck 12 as in step 470, the robot 100 moves the ground gear piece to a testing station 75 as in step 475, uses the gripping device 150 to pick up a previously tested gear piece, and places the untested gear piece at that station. While the ground gear piece 5 is being tested in step 480, the final step 485 to complete the manufacturing cycle is to move the tested gear piece 5 to a completion station 80, and places the gear piece on a rack 53 of a cart 81. When one rack 53 becomes full of finished gear pieces 5, the robot 100 picks up another rack 53 and places it on the cart.

The above manufacturing operation 50 enables processing stations 60, 65, 70 and 75 to perform their functions while other gear pieces 5 are being simultaneously picked up, moved and placed at other stations. The manufacturing operation 50 is able to anneal, grind and test about 120 gear pieces an hour. After a period of time, the cart 81 and its racks 53 of gear pieces 5 are removed for further processing or shipment.

While the invention has been described with reference to a preferred embodiment, it will be understood by those skilled in the art that various changes may be made and equivalents may be substituted without departing from the broader aspects of the invention.

I claim:

1. An end effector of a robotic arm for a multi-station manufacturing operation having a machine with a continuously rotating mount such as a chuck for gripping a workpiece, the workpiece having an outside surface and an inside surface that forms an interior opening, said end effector comprising:

a cross-member having a middle section and first and second ends, said middle section of said cross-member being secured to the robotic arm;

a central gripping device secured to and extending from said middle section of said cross-member, said central gripping device having a gripping mechanism adapted to selectively grip the workpiece;

an unloading arm secured to and extending from said first end of said cross-member, said unloading arm having first and second ends, said first end of said unloading arm having a gripping cylinder, said second end having a rotatable sleeve with a gripping mechanism, said gripping mechanism being adapted to selectively grip the inside surface of the workpiece via said gripping cylinder, and the robotic arm being adapted to insert said gripping mechanism of said unloading arm into the opening in the workpiece when it is held by the continuously rotating mount of the machine; and, a loading arm secured to and extending from said second end of said cross-member, said loading arm having first and second ends, said first end having a gripping cylinder and an extension cylinder, said second end having a rotatable sleeve with a gripping mechanism, said gripping mechanism being adapted to selectively grip the inside surface of the workpiece via said gripping cylinder, said extension cylinder being adapted to selectively and smoothly extend said rotatable sleeve and the workpiece held by its said gripping mechanism into engagement with the continuously rotating mount of the machine.

2. The end effector of claim 1, and wherein said gripping cylinder of said loading arm has an associated piston and said extension cylinder has an associated piston, said extension cylinder being rigidly secured to said cross-member, and said gripping cylinder riding on said piston of said extension cylinder.

3. The end effector of claim 2, and wherein said extension cylinder and gripping cylinder of said loading arm straddle said cross-member to balance said loading arm on said cross-member.

4. The end effector of claim 3, and wherein said extension cylinder is in-line with said gripping cylinder of said loading arm.

5. The end effector of claim 4, and wherein said piston of said extension cylinder carries a hollow shaft, and said piston of said gripping cylinder carries a rod, and said rod passes through and extends from said hollow shaft to engage said gripping mechanism.

6. The end effector of claim 5, and wherein said rotatable sleeve is rotatably secured to said hollow shaft.

7. The end effector of claim 6, and wherein said loading arm has an anti-rotation plate that prevents axial rotation of its said pistons, hollow shaft and rod.

8. The end effector of claim 1, and wherein the robotic arm has a rotatable mount, said middle section of said cross-member being rigidly secured to said rotatable mount, said loading arm and said unloading arm being equidistant from said middle section, and wherein the robotic arm is adapted to align said unloading arm with said continuously rotating mount, and is further adapted to rotate its rotatable mount and said cross-member to align said loading arm with said continuously rotating mount.

9. The end effector of claim 1, and wherein said gripping mechanism of said central gripping device has fingers adapted to extend outwardly and retract inwardly to grip and release the outside surface of the workpiece.

10. The end effector of claim 1, and wherein the robotic arm is equipped with lines for selectively pressurizing said gripping cylinders of said loading and unloading arms, and wherein said gripping mechanisms of said loading and unloading arms includes a mechanical lever, said pressurization of said gripping cylinders and said mechanical levers combining to securely grip the workpiece.

11. A robotic arm for a multi-station manufacturing operation having a machine with a continuously rotating mount for gripping a workpiece, said workpiece having an outside surface and an inside surface that forms an interior opening, said robotic arm comprising:

a robotic arm with a mounting bracket at its proximal end, and lines for supplying pressure;

a cross-member having a middle section and two opposed ends, said middle section of said cross-member being secured to the robotic arm;

a central gripping device secured to and extending from said middle section of said cross-member, said central gripping device having a gripping mechanism adapted to selectively grip the workpiece;

an unloading arm secured to and extending from said first end of said cross-member, said unloading arm having first and second ends, said first end of said unloading arm having a gripping cylinder, said second end having a rotatable sleeve with a gripping mechanism, said gripping mechanism being adapted to selectively grip the inside surface of the workpiece via said gripping cylinder, and said robotic arm being adapted to insert said gripping mechanism of said unloading arm into the opening in the workpiece when it is held by the continuously rotating mount of the machine; and, a loading arm secured to and extending from said second end of said cross-member, said loading arm having first and second ends, said first end having a gripping cylinder and an extension cylinder, said second end having a rotatable sleeve with a gripping mechanism, said gripping mechanism being adapted to selectively grip the inside surface of the workpiece via said gripping cylinder, said extension cylinder being adapted to selectively and smoothly extend said rotatable sleeve and the workpiece held by its said gripping mechanism into engagement with the continuously rotating mount of the machine.

12. The robotic arm of claim 11, and wherein said gripping cylinder of said loading arm has an associated piston and said extension cylinder has an associated piston, said extension cylinder being rigidly secured to said cross-member, and said gripping cylinder riding on said piston of said extension cylinder.

13. The robotic arm of claim 12, and wherein said extension cylinder and gripping cylinder of said loading arm straddle said cross-member to balance said loading arm on said cross-member.

14. The robotic arm of claim 13, and wherein said extension cylinder is in-line with said gripping cylinder of said loading arm.

15. The robotic arm of claim 14, and wherein said piston of said extension cylinder carries a hollow shaft, and said piston of said gripping cylinder carries a rod, and said rod passes through and extends from said hollow shaft to engage said gripping mechanism.

16. The robotic arm of claim 15, and wherein said rotatable sleeve is rotatably secured to said hollow shaft.

17. The robotic arm of claim 16, and wherein said loading arm has an anti-rotation plate that prevents axial rotation of its said pistons, hollow shaft and rod.

18. The end effector of claim 11, and wherein said robotic arm has a rotatable mount, said middle section of said cross-member being rigidly secured to said rotatable mount, said loading arm and said unloading arm being equidistant from said middle section, and wherein said robotic arm is adapted to align said unloading arm with said continuously rotating mount, and is further adapted to rotate its rotatable mount and said cross-member to align said loading arm with said continuously rotating mount.

19. The robotic arm of claim 11, and wherein said gripping mechanism of said central gripping device has fingers adapted to extend outwardly and retract inwardly to grip and release the outside surface of the workpiece.

20. The robotic arm of claim 11, and wherein said robotic arm is equipped with lines for selectively pressurizing said gripping cylinders of said loading and unloading arms, and wherein said gripping mechanisms of said loading and unloading arms includes a mechanical lever, said pressurization of said gripping cylinders and said mechanical levers combining to securely grip the workpiece.

21. A multi-station manufacturing process for machining a number of workpieces having an outside surface and an inside surface that forms an interior opening, said workpieces including first, second and third workpieces, said multi-station process comprising the steps of:

providing first, second and third stations, said second station having a machine with a continuously rotating mount for gripping one of the workpieces, and further providing a robotic arm equipped with an end effector having a gripping device, a loading arm and an unloading arm, each of said gripping device, loading arm and unloading arm having a gripping mechanism;

using said robotic arm to align said gripping mechanism of said gripping device with and gripping the first workpiece;

moving said robotic arm and the first workpiece to a first work station, aligning said loading arm with the second workpiece, gripping the inside surface of and removing the second workpiece, and aligning the first workpiece with said first work station and placing the first workpiece at said first station;

performing a first manufacturing operation on the first workpiece at said first station;

moving said robotic arm to said second station having said machine, using said robotic arm to insert said gripping mechanism of said unloading arm inside the opening of the third workpiece held by said continuously rotating mount, gripping the inside surface of the third workpiece, and moving the third workpiece away from said continuously rotating mount;

aligning said loading arm and the second workpiece with said continuously rotating mount;

extending said extension cylinder of said loading arm to smoothly engage the second workpiece with said continuously rotating mount;

performing a second manufacturing operation on the second workpiece at said second station; and, moving said robotic arm to and placing the third workpiece at said third station.

22. A multi-station manufacturing process for machining a number of workpiece having an outside surface and an inside surface that forms an interior opening, said workpieces including first, second and third workpieces, said multi-station process comprising the steps of:

providing first, second and third stations, said first station having a machine with a continuously rotating mount for gripping the workpiece, and further providing a robotic arm equipped with an end effector having a gripping device, a loading arm and an unloading arm, each of said gripping device, loading arm and unloading arm having a gripping mechanism;

using said robotic arm to align said gripping mechanism of said loading arm with the first workpiece and gripping the inside surface of that workpiece;

moving said robotic arm and the first workpiece to the first station and using said robotic arm to insert said gripping mechanism of said unloading arm inside the opening of the second workpiece held by said continuously rotating mount, gripping the inside surface of the second workpiece, and moving the said workpiece away from said continuously rotating mount;

aligning said loading arm and the first workpiece with said continuously rotating mount;

extending an extension cylinder of said loading arm to smoothly engage the first workpiece with said continuously rotating mount;

performing a first manufacturing operation on the first workpiece at said first station;

using said robotic arm to move the second workpiece away from said machine;

moving said robotic arm and the second workpiece, using said robotic arm to align said gripping mechanism of said gripping device with the third workpiece at said second workstation and gripping that third workpiece, and placing said second workpiece at said second station; and, moving said robotic arm to and placing the third workpiece at said third station.

23. The multi-station manufacturing process of claim 22, and wherein a second manufacturing operation is performed on the workpiece at one of said second or third stations.

* * * * *